(12) United States Patent
Oishi

(10) Patent No.: US 9,886,778 B2
(45) Date of Patent: Feb. 6, 2018

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventor: Tetsu Oishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 14/951,679

(22) Filed: Nov. 25, 2015

(65) Prior Publication Data

US 2016/0078643 A1    Mar. 17, 2016

Related U.S. Application Data

(63) Continuation of application No. 12/936,478, filed as application No. PCT/JP2009/061542 on Jun. 18, 2009, now Pat. No. 9,240,057.

(30) Foreign Application Priority Data

Jun. 25, 2008  (JP) .................................. 2008-166090

(51) Int. Cl.
  *G06F 3/12*    (2006.01)
  *G06T 11/00*   (2006.01)
  *G06K 15/02*   (2006.01)

(52) U.S. Cl.
  CPC .......... *G06T 11/00* (2013.01); *G06K 15/1826* (2013.01)

(58) Field of Classification Search
  CPC ........................... G06T 11/00; G06K 15/1826

USPC ........................................................ 358/1.15
See application file for complete search history.

(56) References Cited

U.S. PATENT DOCUMENTS

| 6,456,298 B1 | 9/2002 | Kunimasa et al. |
| 6,963,412 B1 | 11/2005 | Toda |
| 2005/0116963 A1* | 6/2005 | Bourdev ............... G06T 15/503 345/619 |

(Continued)

FOREIGN PATENT DOCUMENTS

| JP | 2001-293936 A | 10/2001 |
| JP | 2006-244248 A | 9/2006 |
| JP | 2008-17135 A | 1/2008 |

*Primary Examiner* — Neil R McLean
(74) *Attorney, Agent, or Firm* — Fitzpatrick, Cella, Harper & Scinto

(57) ABSTRACT

Whether or not a received drawing instruction is an instruction which needs an arithmetic operating process with a background portion is discriminated. When it is determined that the received drawing instruction is not the instruction which needs the arithmetic operating process with the background portion, the drawing instruction is converted into a drawing command and transmitted to a printing apparatus, and the received drawing instruction is stored as intermediate data. When it is determined that the received drawing instruction is the instruction which needs the arithmetic operating process with the background portion, the intermediate data which relates to the received drawing instruction is extracted from the intermediate data stored by the storing step, a drawing command in which the arithmetic operating process of the received drawing instruction has been executed to the extracted intermediate data is formed and transmitted to the printing apparatus.

15 Claims, 21 Drawing Sheets

(56) References Cited

U.S. PATENT DOCUMENTS

2008/0122868 A1    5/2008   Mizutani et al.
2009/0097047 A1    4/2009   Mitsui

* cited by examiner

EDGE INFORMATION
(6,2)-(2,4)
(2,4)-(1,8)
(6,2)-(8,8)
Color
(R,G,B)-(255,0,0)
OVERLAP
Level=1

EDGE INFORMATION
(4,3)-(2,4)
(2,4)-(1,8)
(4,3)-(4,8)
Color
 (R,G,B)-(255,0,0)
OVERLAP
 Level=1

EDGE INFORMATION
(6,2)-(4,3)
(4,3)-(1,8)
(6,2)-(8,8)
Color
 (R,G,B)-(255,0,0)
OVERLAP
 Level=1

FORMING DATA
OF APPLICATION

DRAWING COMMAND TO
PRINTING APPARATUS

FORMING DATA
OF APPLICATION

DRAWING COMMAND TO
PRINTING APPARATUS

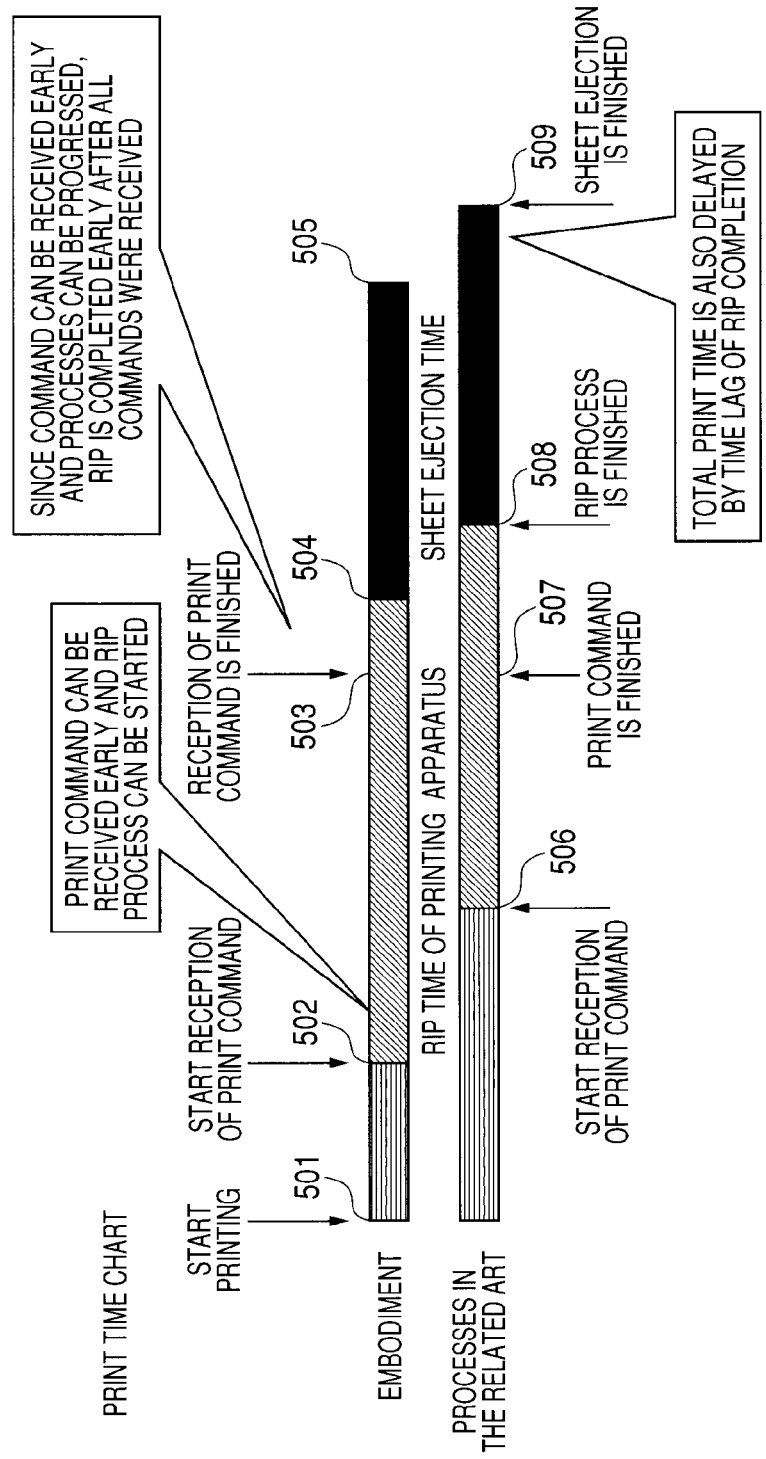

INFORMATION PROCESSING APPARATUS, INFORMATION PROCESSING METHOD, AND PROGRAM

The present application is a continuation of U.S. application Ser. No. 12/936,478, filed on Oct. 5, 2010, which is a national phase entry of PCT/JP2009/061542, filed on Jun. 18, 2009, which claims priority to JP 2008-166090, filed Jun. 25, 2008, the entire disclosure of each of which is incorporated by reference herein.

TECHNICAL FIELD

The invention relates to an information processing apparatus, an information processing method, and a program for converting a received drawing instruction into a drawing command and transmitting it to a printing apparatus.

BACKGROUND ART

In recent years, a number of applications draw images with attractive "transparent data". Although there is a device which can process the "transparent data", there are many devices such as a reasonable device and the like which cannot process the "transparent data".

Even the device which cannot process the "transparent data" executes a process for eliminating a "transparent portion" prior to transmitting the data to the device by a printer driver so that a desired output can be performed. To process the transparent data, a drawing image of a background is necessary and drawing images of one whole page are necessary.

In a "transparent data" processing method in the related art, there is such a technique that drawing images of one page are spooled and divided into a "transparent data portion" and a "portion in which the transparent data portion has been hollowed out" and drawing commands are formed (for example, refer to Japanese Patent Application Laid-Open No. 2001-293936).

However, there are the following problems in the related art.

In the related art, since it is necessary to form the drawing command after the drawing images of one page were spooled, timing for starting the transmission of the drawing command is delayed.

There is also a case where a white stripe (gap) occurs between the "transparent data portion" and the "portion in which the transparent data portion has been hollowed out" due to a calculation error in a printer.

An efficiency deteriorates in the case where there are a number of objects which overlap the transparent data.

DISCLOSURE OF THE INVENTION

To solve the above problems, according to the invention, there is provided an information processing apparatus characterized by comprising:

a discrimination unit that discriminates whether or not a received drawing instruction is an instruction which needs an arithmetic operating process with a background portion;

a storing unit that, when it is determined by the discrimination unit that the received drawing instruction is not the instruction which needs the arithmetic operating process with the background portion, converts the drawing instruction into a drawing command, transmits the drawing command to a printing apparatus, and stores the received drawing instruction as intermediate data; and a transmission unit that, when it is determined by the discrimination unit that the received drawing instruction is the instruction which needs the arithmetic operating process with the background portion, extracts the intermediate data which relates to the received drawing instruction from the intermediate data stored by the storing unit, forms a drawing command in which the arithmetic operating process of the received drawing instruction has been executed to the extracted intermediate data, and transmits the drawing command to the printing apparatus.

Further features of the present invention will become apparent from the following description of exemplary embodiments with reference to the attached drawings.

BRIEF DESCRIPTION OF THE DRAWINGS

FIG. 24 is a print time charts in the related art and the embodiment.

BEST MODE FOR CARRYING OUT THE INVENTION

A best mode for carrying out the invention will be described hereinbelow with reference to the drawings.

Figure 1:
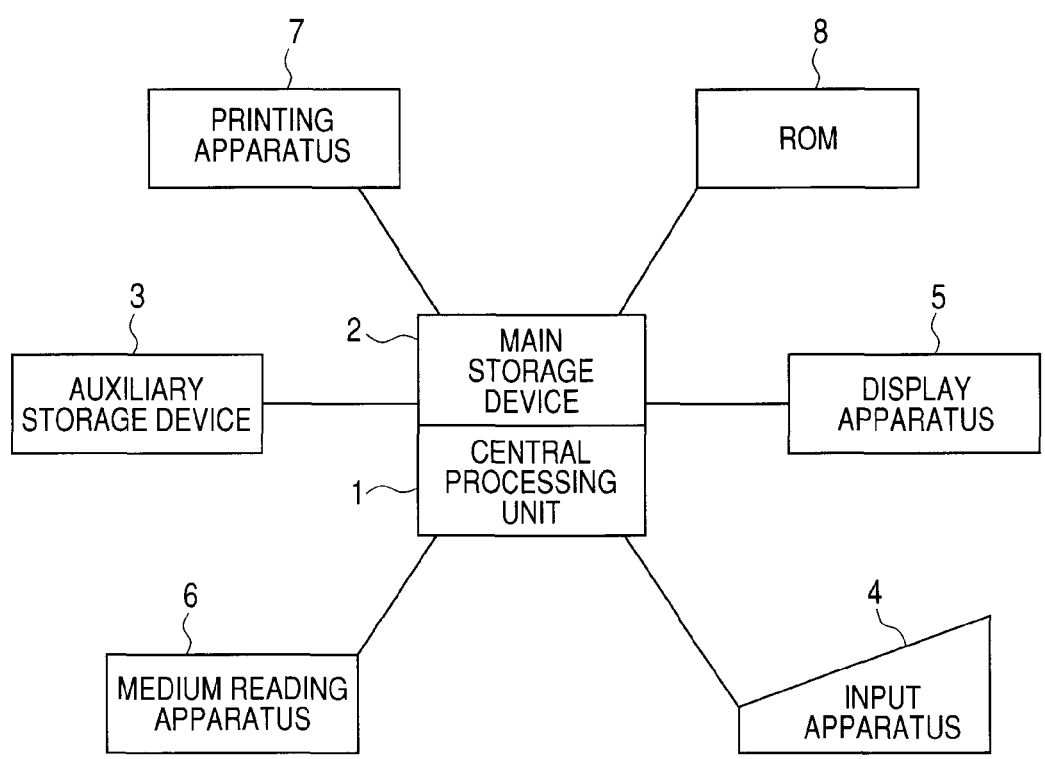
FIG. 1 is a schematic diagram illustrating a construction of an information processing system according to an embodiment of the invention.

FIG. 1 is a schematic diagram illustrating a construction of an information processing system according to the embodiment of the invention.

Figure 2:
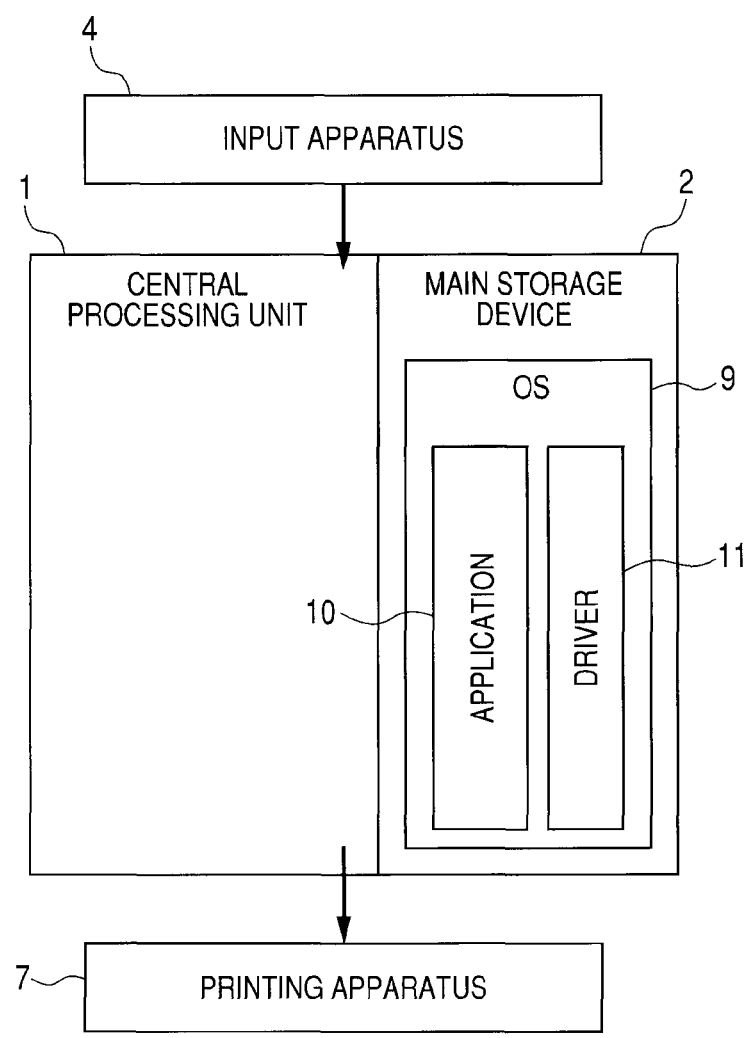
FIG. 2 is a diagram illustrating a relation among a central processing unit 1, a main storage device 2, an input apparatus 4, and a printing apparatus 7.

A central processing unit 1, a main storage device 2, an auxiliary storage device 3, an input apparatus 4, a display apparatus 5, a medium reading apparatus 6, a printing apparatus 7, and a ROM 8 are provided for the information processing system. A relation among the central processing unit 1, main storage device 2, input apparatus 4, and printing apparatus 7 is as illustrated in FIG. 2. The information processing system functions as an image processing apparatus.

The central processing unit 1 reads out various kinds of programs including a printer driver, data, and the like recorded in a recording medium such as flexible disk, CD-ROM, IC memory card, or the like through the medium reading apparatus 6 and executes them. Based on an operating system (OS) 9, an application program 10, a printer driver 11, and the like which have been loaded into the main storage device 2, the central processing unit 1 processes information input from the input apparatus 4, and outputs to the display apparatus 5, printing apparatus 7, or the like. The OS 9, application program 10, printer driver 11, and the like are loaded, for example, from the auxiliary storage device 3. As an auxiliary storage device 3, for example, a hard disk, a magnetooptic disk, or the like is used solely or in combination. Those apparatuses may be connected through a network. As an input apparatus 4, for example, a keyboard, a pointing device, or the like is used solely or in combination. The operating system (OS) 9, application program 10, and printer driver 11 have been stored in, for example, the ROM 8.

For example, as illustrated in FIG. 2, a printing instruction input from the input apparatus 4 is processed by the central processing unit 1 by using the application program 10 and the printer driver 11 and output to the printing apparatus 7. At this time, the application program 10 and the printer driver 11 function under the control of the OS 9.

Figure 3:
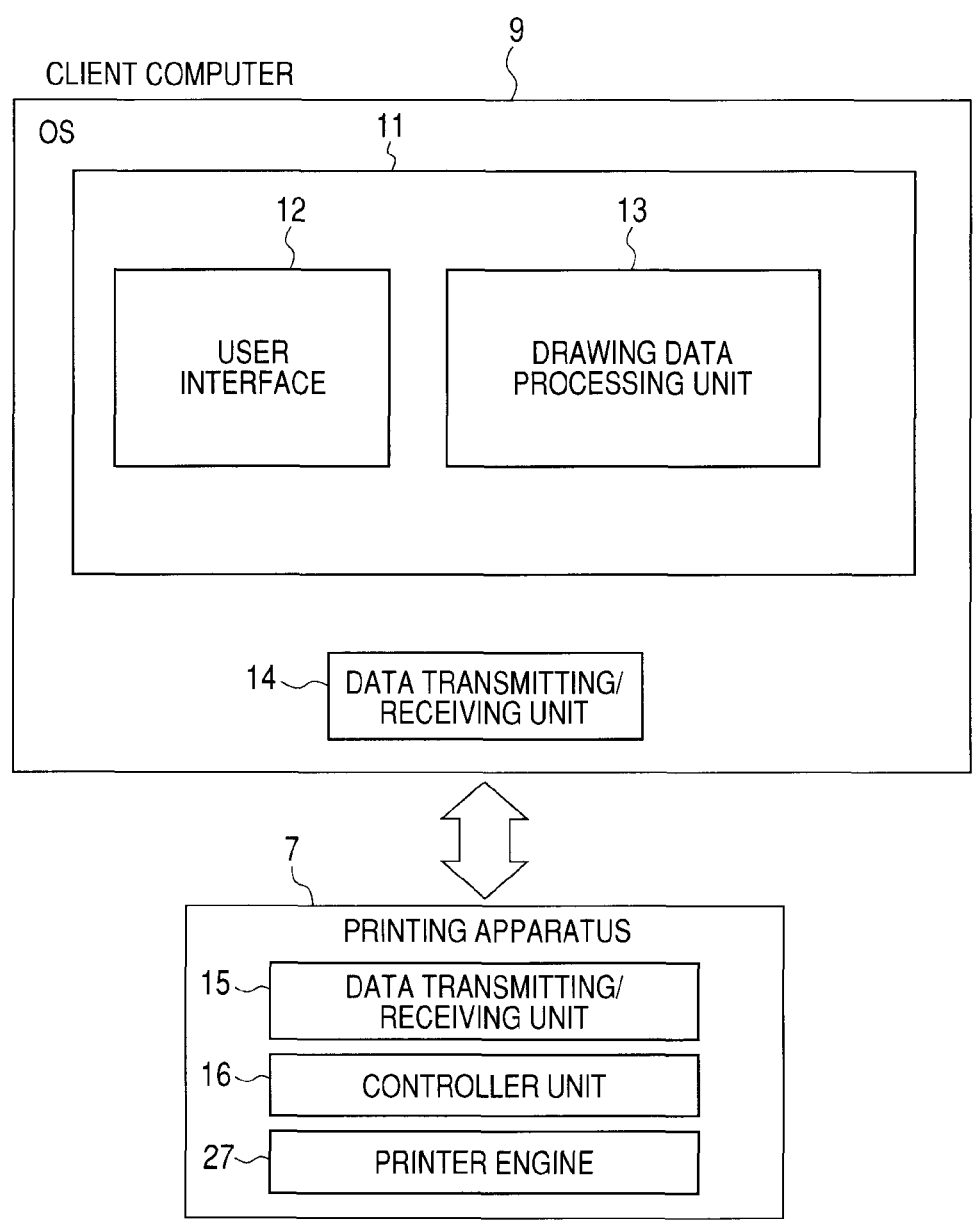
FIG. 3 is a functional block diagram illustrating a functional construction of a client computer.

A client computer having the central processing unit 1 and the main storage device 2 will now be described. FIG. 3 is a functional block diagram illustrating a functional construction of the client computer.

Figure 4:
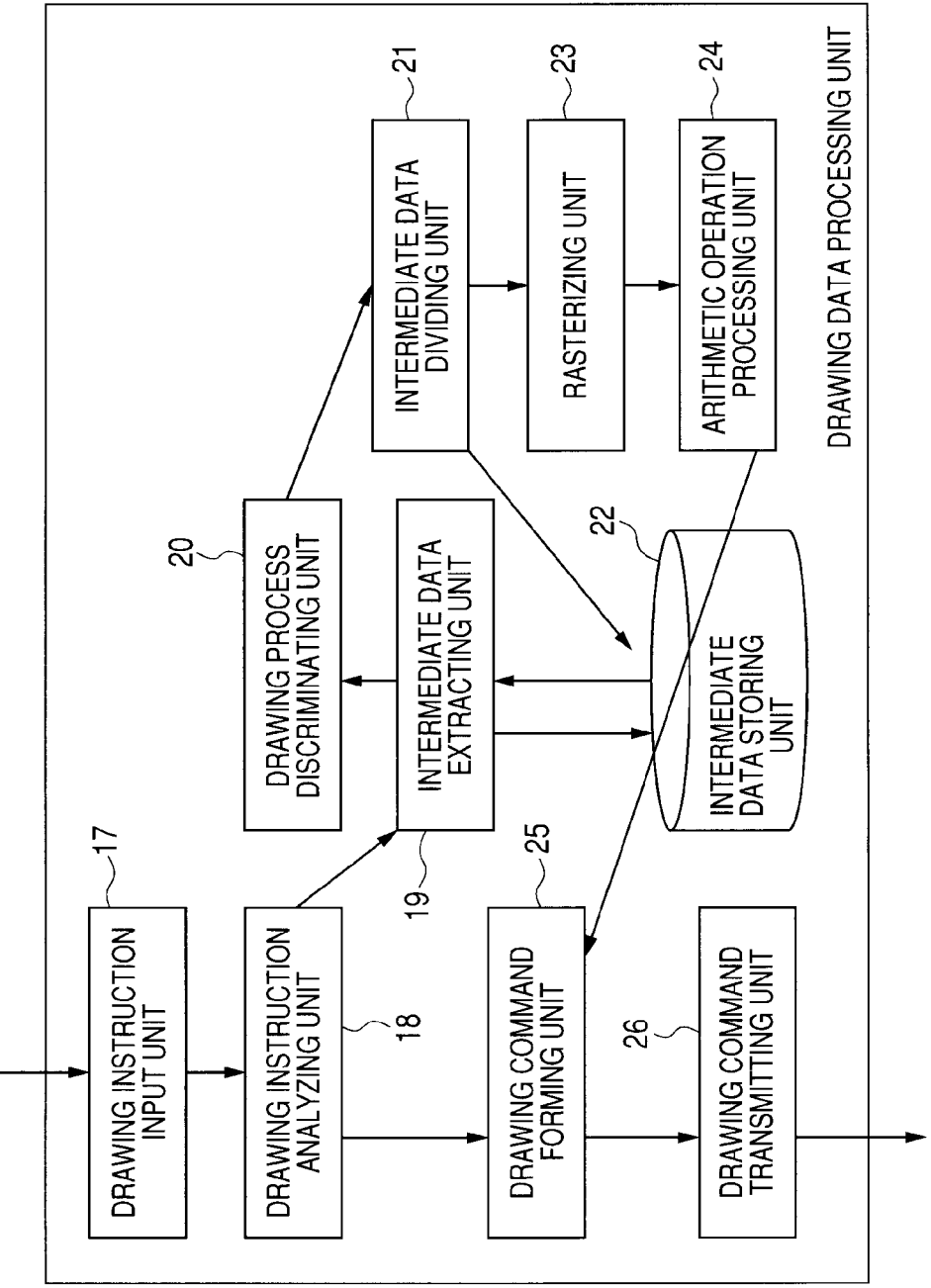
FIG. 4 is a functional block diagram illustrating a functional construction of a drawing data processing unit.

As mentioned above, the application program 10 and the printer driver 11 function under the control of the OS 9. A user interface unit 12 and a drawing data processing unit 13 are included in the printer driver 11. Further, the drawing data processing unit 13 has a construction as illustrated in FIG. 4. FIG. 4 is a diagram illustrating a feature of the embodiment.

The user interface unit 12 allows the user to input various print settings and the like such as setting to the printing apparatus 7 and the like or to input a print start instruction. The drawing data processing unit 13 receives the designated drawing instruction from the application program 10 and forms data which can be processed in the printing apparatus 7.

Figure 9:
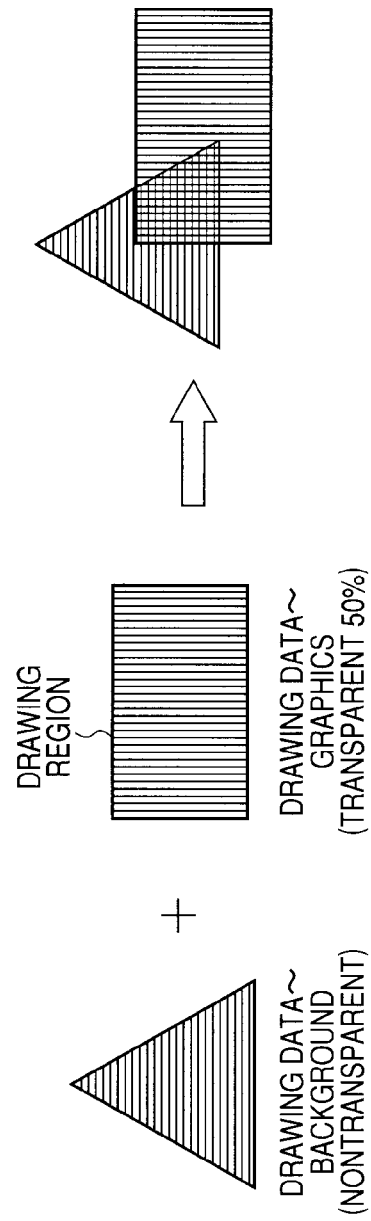
FIG. 9 is a diagram illustrating graphic transparent data.
Figure 10:
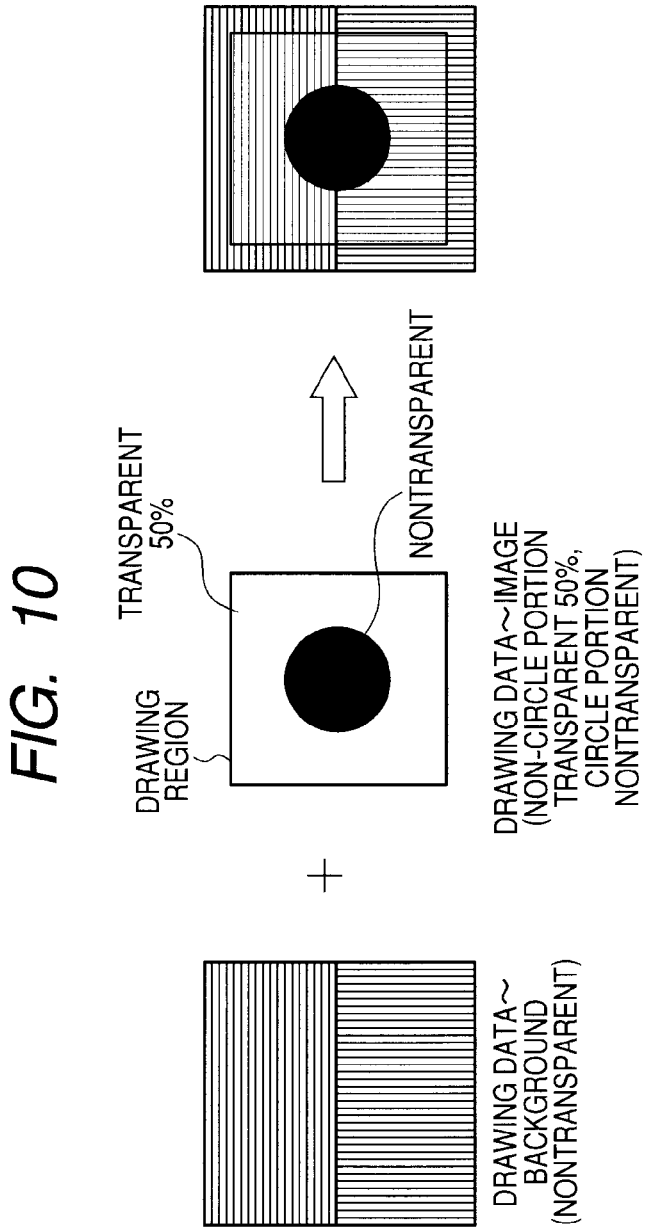
FIG. 10 is a diagram illustrating image transparent data.

Subsequently, the operation in the drawing data processing unit 13 will be described. In the drawing data processing unit 13, when the drawing instruction is sent from the application, the drawing instruction is received by a drawing instruction input unit 17 and is analyzed in a drawing instruction analyzing unit 18 to see if it is an instruction which needs an arithmetic operating process with a background portion. The instruction which needs the arithmetic operating process is transparent data or ROP data. A transmitting instruction is mainly classified into two kinds of instructions such as graphic and image as illustrated in FIGS. 9 and 10. (It is assumed that a text is incorporated in the graphic.) FIG. 9 illustrates an example of transmission of the graphic and FIG. 10 illustrates an example of transmission of the image. The ROP (Raster Operation) arithmetic operation includes a logical product (AND), a logical sum (OR), an exclusive logical sum (XOR), an inversion (NOT), and the like.

Figure 13:
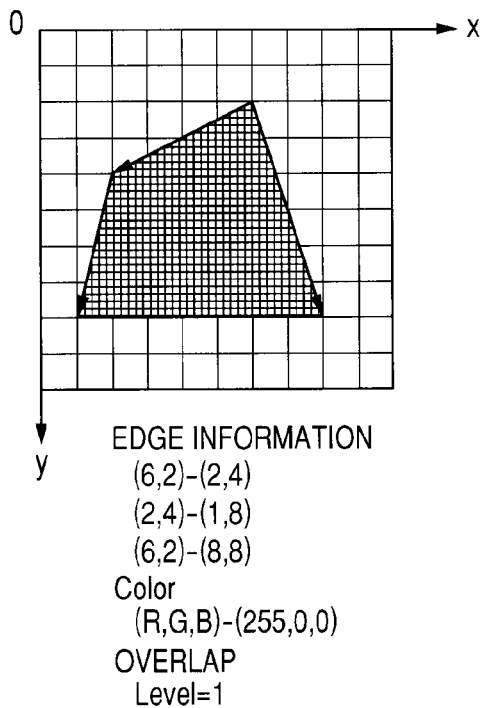
FIG. 13 is a diagram illustrating edge information.

After the analysis, a drawing command forming unit 25 sequentially forms the drawing commands from the drawing instructions. The command is transmitted from a drawing command transmitting unit 26 toward the printing apparatus 7 through a data transmitting/receiving unit 14. Simultaneously with that the drawing command is formed in the drawing command forming unit 25, intermediate data is extracted from the drawing instruction by an intermediate data extracting unit 19 and spooled into an intermediate data storing unit 22. An edge list is used as intermediate data. The edge list is constructed by: an outline (edges) of drawing elements and information of a painting color and an overlap as illustrated in FIG. 13. Although the intermediate data uses a format of the edge list in the embodiment, the drawing instruction itself may be held as intermediate data.

If it is determined in the drawing instruction analyzing unit 18 that the drawing instruction is an instruction which needs an arithmetic operation, an intermediate data dividing unit 21 divides the intermediate data which extends over the inside and outside of the arithmetic operating region in the intermediate data included in an arithmetic operating region of the drawing instruction according to a discrimination result of a drawing process discriminating unit 20. The intermediate data existing inside of the arithmetic operating region including the divided data is rasterized in a rasterizing unit 23. An arithmetic operating process is executed in an arithmetic operation processing unit 24 by using raster data which is formed and the drawing instruction. A result of the arithmetic operating process is also converted into a command in the drawing command forming unit 25. The command is transmitted from the drawing command transmitting unit 26 toward the printing apparatus 7.

The data transmitting/receiving unit 14 is included in the OS 9 as a part of its functions. The data transmitting/receiving unit 14 executes transmission and reception of data to/from the printing apparatus 7 by being connected by a centronics or the like.

A data transmitting/receiving unit 15 and a controller unit 16 are included in the printing apparatus 7. The data transmitting/receiving unit 15 executes transmission and reception of data to/from the client computer. The controller unit 16 performs control or the like of a printer engine 27 based on the data received by the data transmitting/receiving unit 15.

Figure 5:
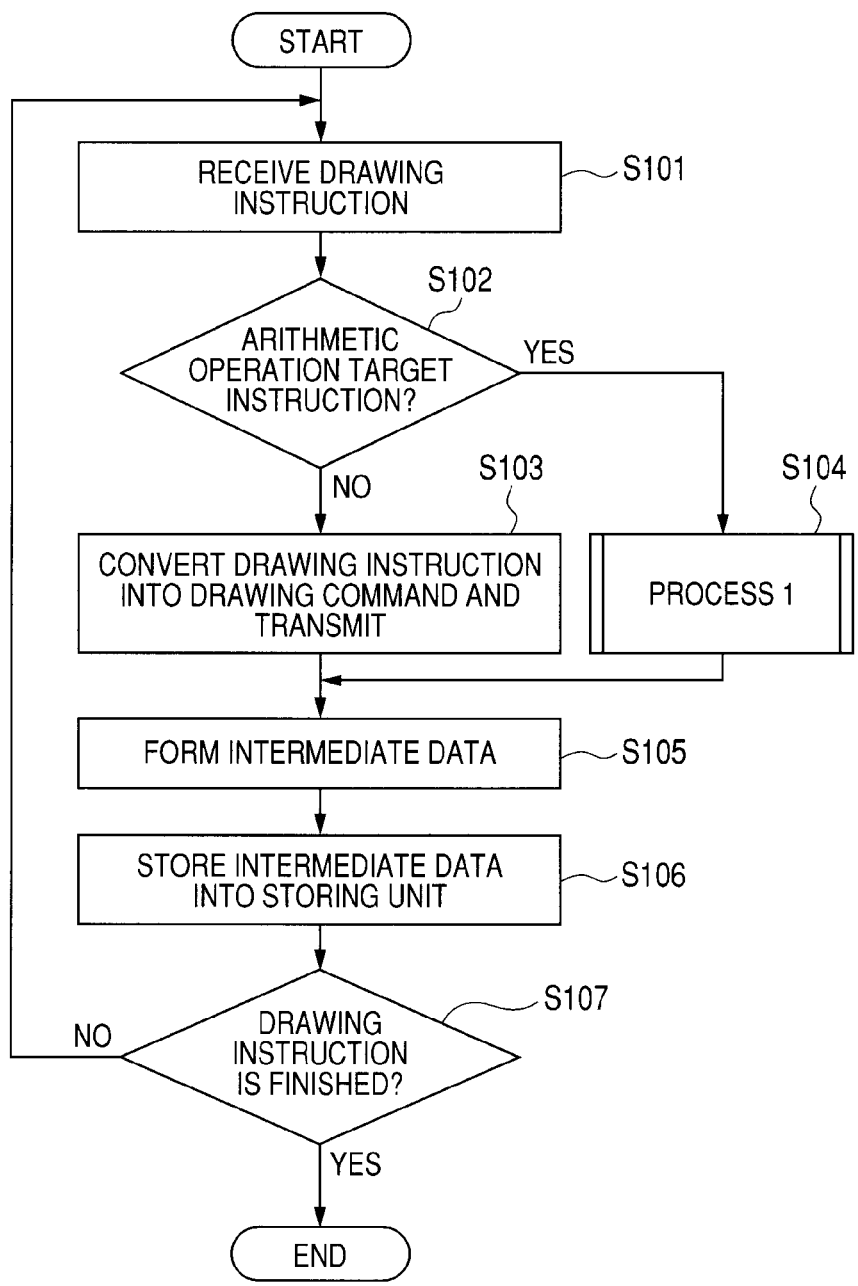
FIG. 5 is a flowchart illustrating a process of the drawing data processing unit.
Figure 6:
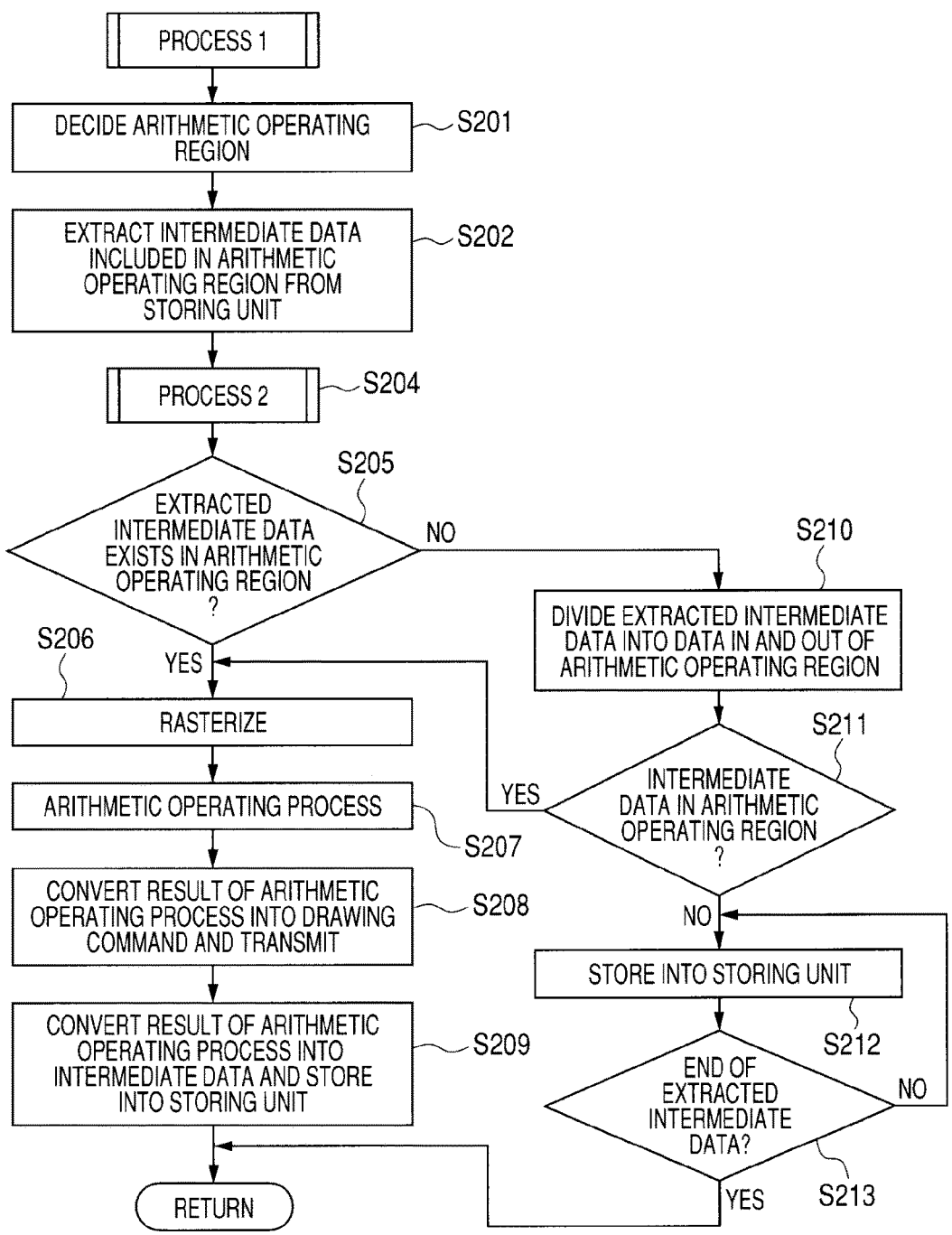
FIG. 6 is a flowchart illustrating a process of data which needs an arithmetic operating process.

Subsequently, a drawing method of transparent data will be described as an example of the drawing instruction which needs an arithmetic operation in the information processing system constructed as mentioned above. FIGS. 5 and 6 are flowcharts illustrating the drawing method (program) of the transparent data. The flowcharts are stored in the main storage device 2 and are executed in the central processing unit 1. However, the flowcharts may be executed by the CPU in the display apparatus 5 or an application program which can execute a bit map process in the client computer.

First, when an instruction is input from the input apparatus 4 so as to execute the print, the OS 9 which has been read out of the auxiliary storage device 3 and stored into the main storage device 2 receives the print instruction. The OS 9 transfers the print execution to the application program 10 which has been active at this point of time.

When the print instruction is received, the application program 10 converts the print instruction into a command which can be recognized by the OS 9 and sends a message of data to be printed and the command to the OS 9. The OS 9 converts the message into a command which can be recognized by the printer driver 11 and sends it to the printer driver 11. The data to be printed is, for example, a drawing instruction formed by the input of an instruction made by the user through the input apparatus 4 during the execution of the application program 10.

If a command for initialization is included in the received commands, the printer driver 11 executes the following processes based on a setting made through the user interface unit 12 or a default setting.

First, the drawing instruction input unit 17 receives the drawing instruction included by the application program (step 101: hereinbelow, "step" is abbreviated to "S"). The drawing instruction analyzing unit 18 discriminates whether or not the received data is an arithmetic operation target instruction (S102). If the received data is the arithmetic operation target instruction such as transparent data or ROP data, the processing routine advances to a process 1 illustrated in FIG. 6 (S104). If it is not the arithmetic operation target instruction, the drawing instruction is converted into the drawing command by the drawing command forming unit 25 and the drawing command is transmitted to the printing apparatus 7 by the drawing command transmitting unit 26 (S103). At the same time, intermediate data is formed by the intermediate data extracting unit 19 (S105). The intermediate data is stored in the intermediate data storing unit 22 (S106). The above operation is repeated until the drawing instruction is finished (S107).

Subsequently, a case where it is decided in the drawing instruction analyzing unit 18 that the received data is the arithmetic operation target instruction and the processing routine advances to the process 1 (FIG. 6) is illustrated.

Figure 11:
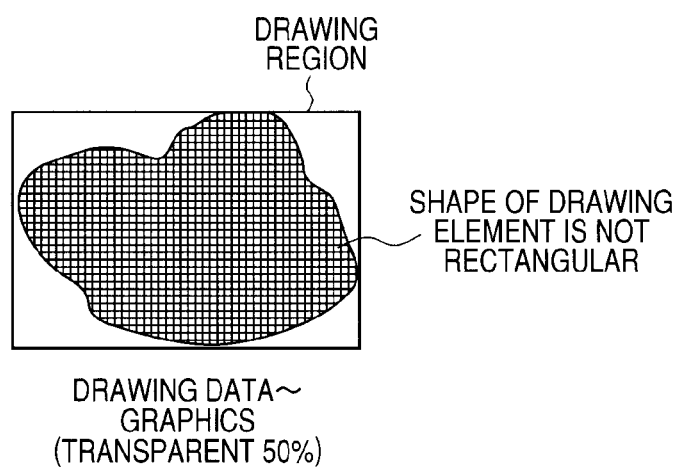
FIG. 11 is a diagram illustrating a drawing region of data in which a shape of a drawing element is not rectangular.

The drawing instruction analyzing unit 18 decides a region where the arithmetic operating process is required (hereinbelow, referred to as "arithmetic operating region") from attribute information included in the drawing instruction (S201). In examples of FIGS. 9 and 10, a rectangle as a shape of the drawing instruction becomes the arithmetic operating region. If the shape of the drawing instruction is not the rectangle as illustrated in FIG. 11, a circumscribed rectangle of a drawing element becomes the arithmetic operating region.

When the arithmetic operating region is decided, the intermediate data extracting unit 19 extracts an edge list included in the arithmetic operating region, that is, an edge list regarding image elements existing in the arithmetic operating region from the edges stored in the intermediate data storing unit 22 (S202). In an example of FIG. 12, among drawing elements a, b, and c, the drawing elements included in the arithmetic operating region are a and b.

Figure 14:
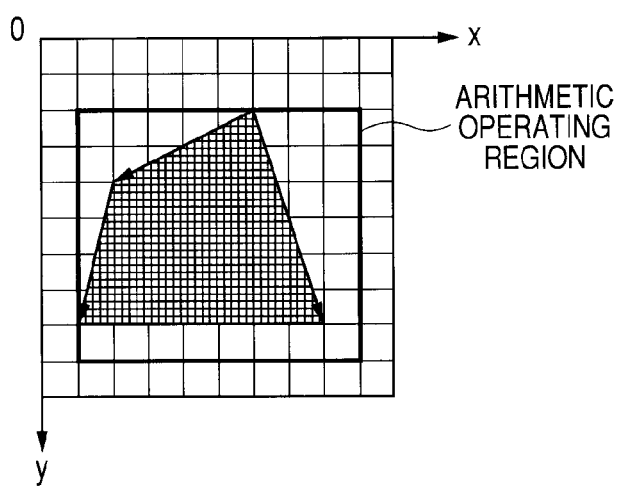
FIG. 14 is a diagram illustrating the drawing element existing in the arithmetic operating region.

The drawing process discriminating unit 20 discriminates whether or not the whole extracted edge list exists in the arithmetic operating region (S205). In the case where the edges are included in the arithmetic operating region like a drawing element b in FIG. 12 or as illustrated in FIG. 14, the rasterizing unit 23 rasterizes the edge list (S206).

Figure 12:
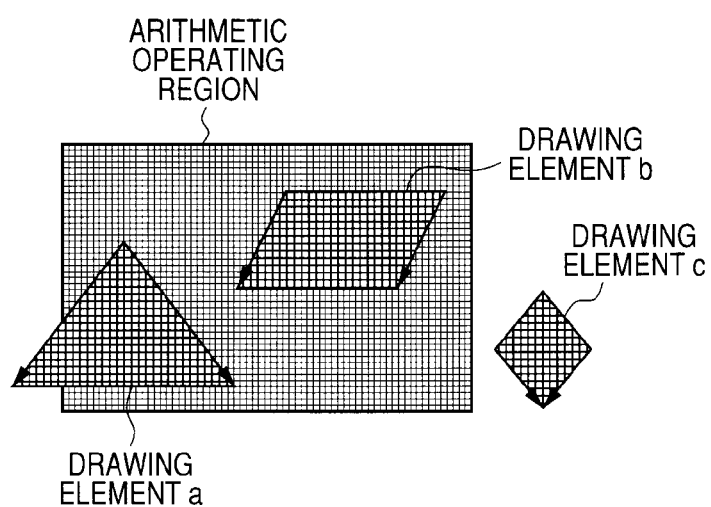
FIG. 12 is a diagram illustrating a relation between the drawing element and the arithmetic operating region.
Figure 15:
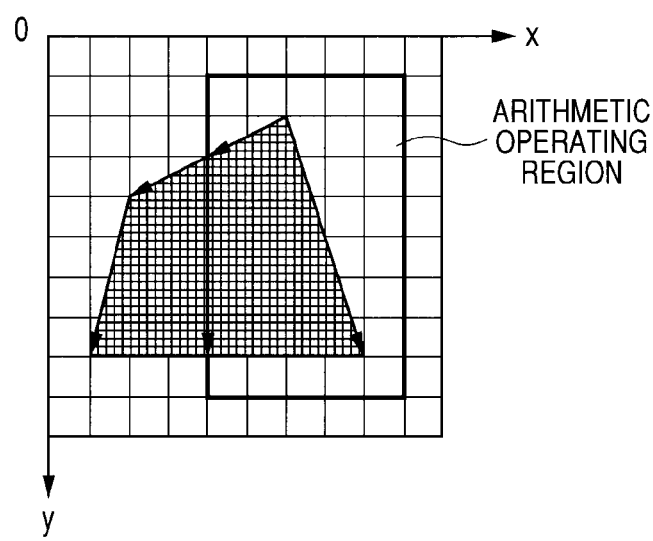
FIG. 15 is a diagram illustrating a dividing method of edges of the drawing element extending over the arithmetic operating region.

In the case where the edges extend both inside and outside of the arithmetic operating region like a drawing element a in FIG. 12, the intermediate data dividing unit 21 divides those edges into an edge list of the inside of the arithmetic operating region and an edge list of the outside thereof (S210). That is, edges illustrated in FIG. 13 of the original data are divided as illustrated in FIG. 15.

The rasterizing unit rasterizes only the inside edges (S206).

At this time, the outside edge list is stored again as intermediate data into the intermediate data storing unit 22 (S211, S212). Thus, raster data is formed only with respect to the inside of the arithmetic operating region.

When all of the extracted edge lists are rasterized in this manner, the arithmetic operation processing unit 24 executes an arithmetic operating process of the formed raster data and the image element which is decided by the drawing instruction (S207). A resultant output of the arithmetic operating process regarding the drawing instruction is converted into the drawing command by the drawing command forming unit 25 and the drawing command is transmitted by the drawing command transmitting unit 26 (S208). The arithmetic operation result is also converted into the drawing command and also converted into the intermediate data and the intermediate data is stored into the storing unit (S209). By storing the arithmetic operation result as intermediate data, it can be used when such an arithmetic operating process drawing instruction that a plurality of transparent data overlap and the present arithmetic operation result is set to a background has been transmitted later.

Figure 16:
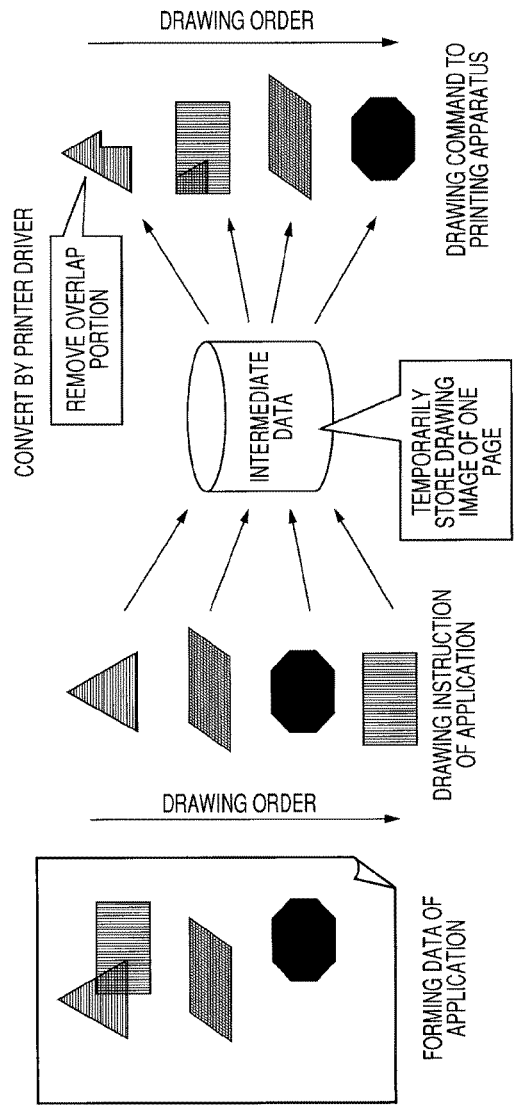
FIG. 16 is a diagram illustrating an example in which drawing instructions of one page from applications are spooled into an intermediate file and, thereafter, commands are formed and sent.

As mentioned above, according to the drawing information processing apparatus of the embodiment, when executing the arithmetic operating process, the rasterization is executed only with respect to the arithmetic operating process by using the edge lists stored in the intermediate data storing unit. With respect to the drawing instructions which do not need the arithmetic operating process, they can be successively converted into the commands while storing the intermediate data. As shown in the related art, hitherto, the drawing images cannot be converted into commands until all of the drawing images of one page are spooled and the commands cannot be transmitted to the printing apparatus 7. When the transparent data is included in "forming data of application" as illustrated in FIG. 16, the drawing instructions from the application are not always arranged in order on a coordinate axis. Since a portion which becomes the background of the transparent data is not known until a transparent data instruction is called, it is necessary to store all of the drawing instructions so far. In the related art, since the drawing command in which the portion that overlaps the transparent data has been removed is formed, after the drawing instructions of one page were stored and a transparent data process or the like was executed, the first drawing command is sent.

Figure 17:
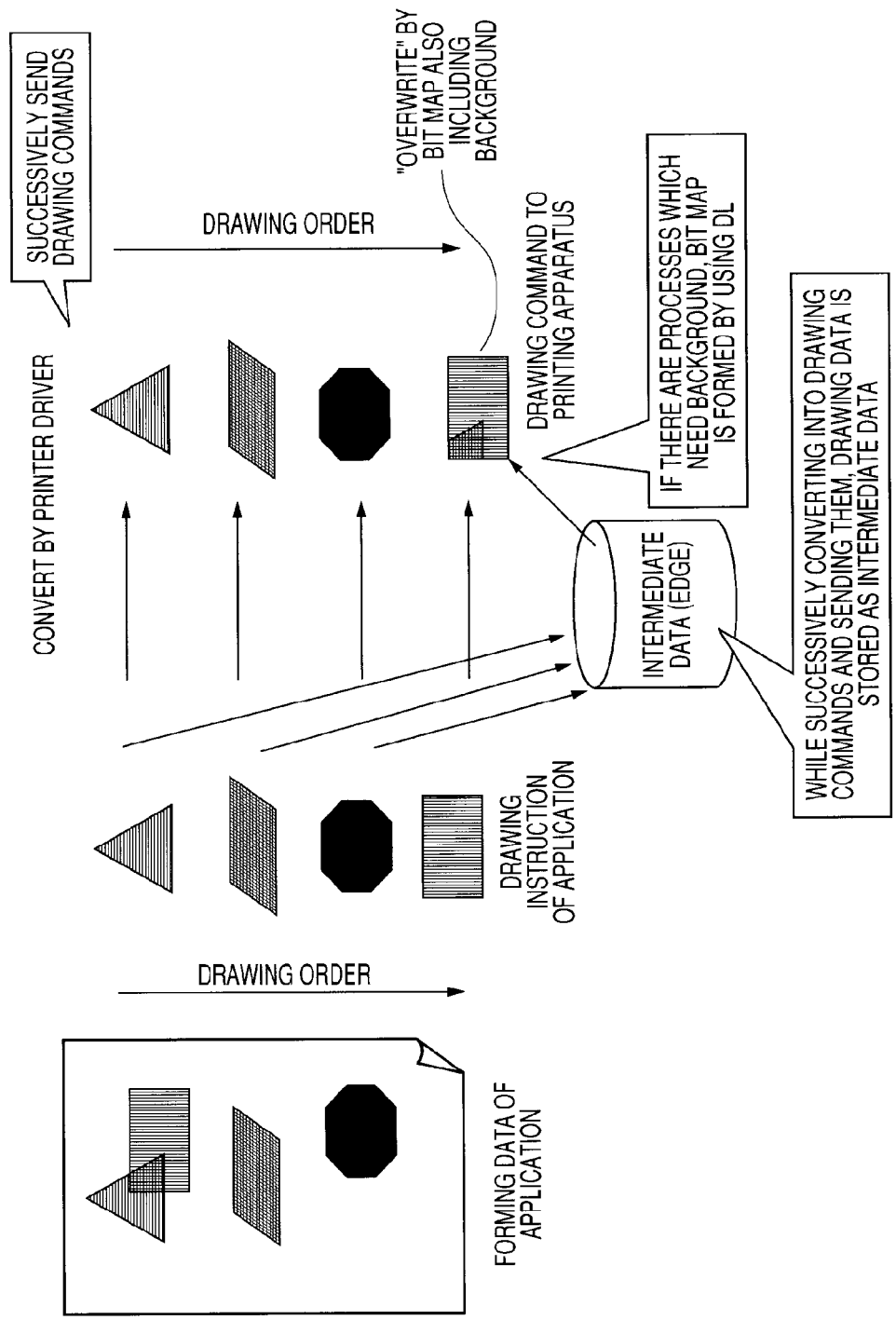
FIG. 17 is a diagram illustrating an example in which while the drawing instructions from the applications are successively converted into commands and sent, the drawing instructions are spooled as intermediate data.

In the embodiment, by overwriting by a bit map of the arithmetic operation result also including the background, the drawing instructions in which the arithmetic operating process is not executed can be immediately converted into the drawing commands and sent. As illustrated in FIG. 17, while the drawing instructions from the applications are successively converted into the drawing commands and sent, they are also stored as intermediate data. If there are processes which need the background, the bit map also including the background is formed by using the stored intermediate data, is sent to the printing apparatus, and is "overwritten" even if the drawing images have already existed.

Therefore, the process can be started early by the printing apparatus 7 and a print processing time as a whole image forming system can be remarkably shortened. Although the intermediate data is stored, if there are no processes which need the background, the intermediate data is not used but is abandoned as it is. Thus, a processing speed similar to that in the case where the intermediate data is not stored is obtained.

FIG. 24 illustrates print time charts in the embodiment and the related art. A state where the print processing time in the embodiment is shortened as compared with that in the related art is shown by using the print time charts.

At 501, the print is started and the process is started in the printer driver. In the embodiment, when the printer driver receives the drawing instruction from the application, it immediately sends the print command. Therefore, the printing apparatus starts the reception of the print command and can start the process at 502. In the related art, after the printer driver received the drawing instructions of one page from the applications and processed them, it sends the print command. Therefore, the command is received from 506. Although the reception of the print command is finished at almost the same timing at 503 and 507, in the embodiment, since the print command was received and the process was started early, a time that is required until the RIP process is finished (the drawing bit map is formed) is short (504). In the related art, a time that is required until the RIP process is finished is long by the delay time required for the reception of the print command (508). Since a time that is required for ejecting the sheet in the embodiment and that in the related art are almost equal, also as a whole print time, a difference between 505 and 509 occurs and the print processing time in the embodiment can be shortened as compared with that in the related art.

Figure 18:
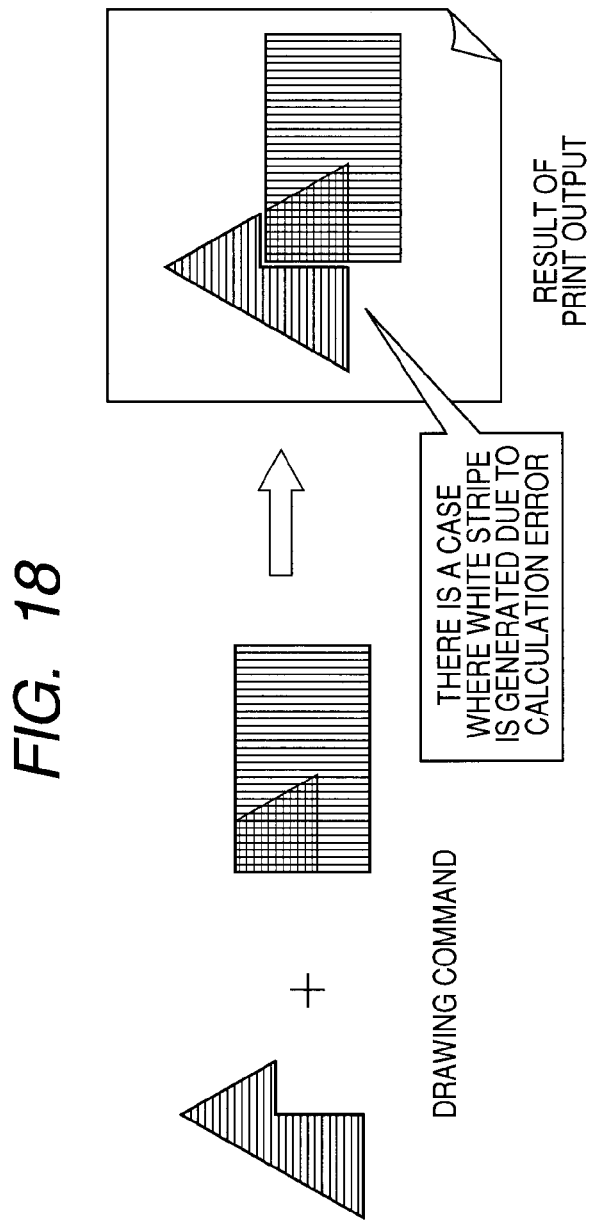
FIG. 18 is a diagram illustrating a white stripe (gap).

In the related art, there is a case where the white stripe (gap) occurs between the "transparent data" and the "portion in which the transparent data portion has been hollowed out" due to the arithmetic operation error or the like in the device (FIG. 18).

Figure 19:
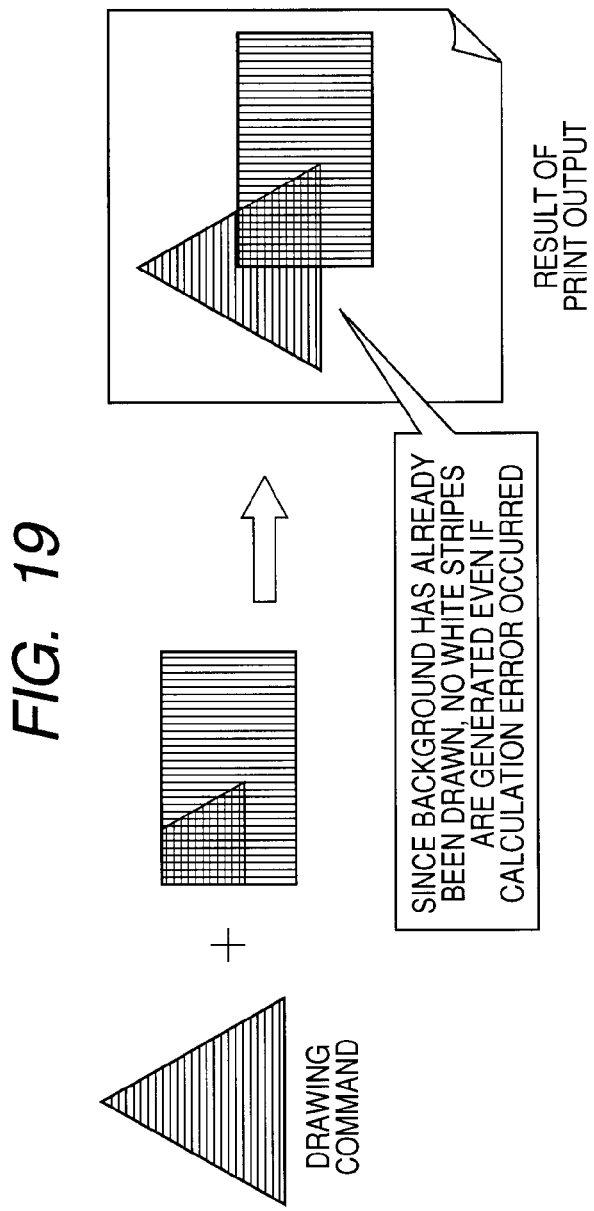
FIG. 19 is a diagram illustrating an example in which no white stripe (gap) occurs.

In the embodiment, since the original data "in which the transmission portion is not hollowed out" is sent as a drawing command, the background is drawn. Therefore, even if the calculation error occurred, no white stripes are generated (FIG. 19).

Figure 20:
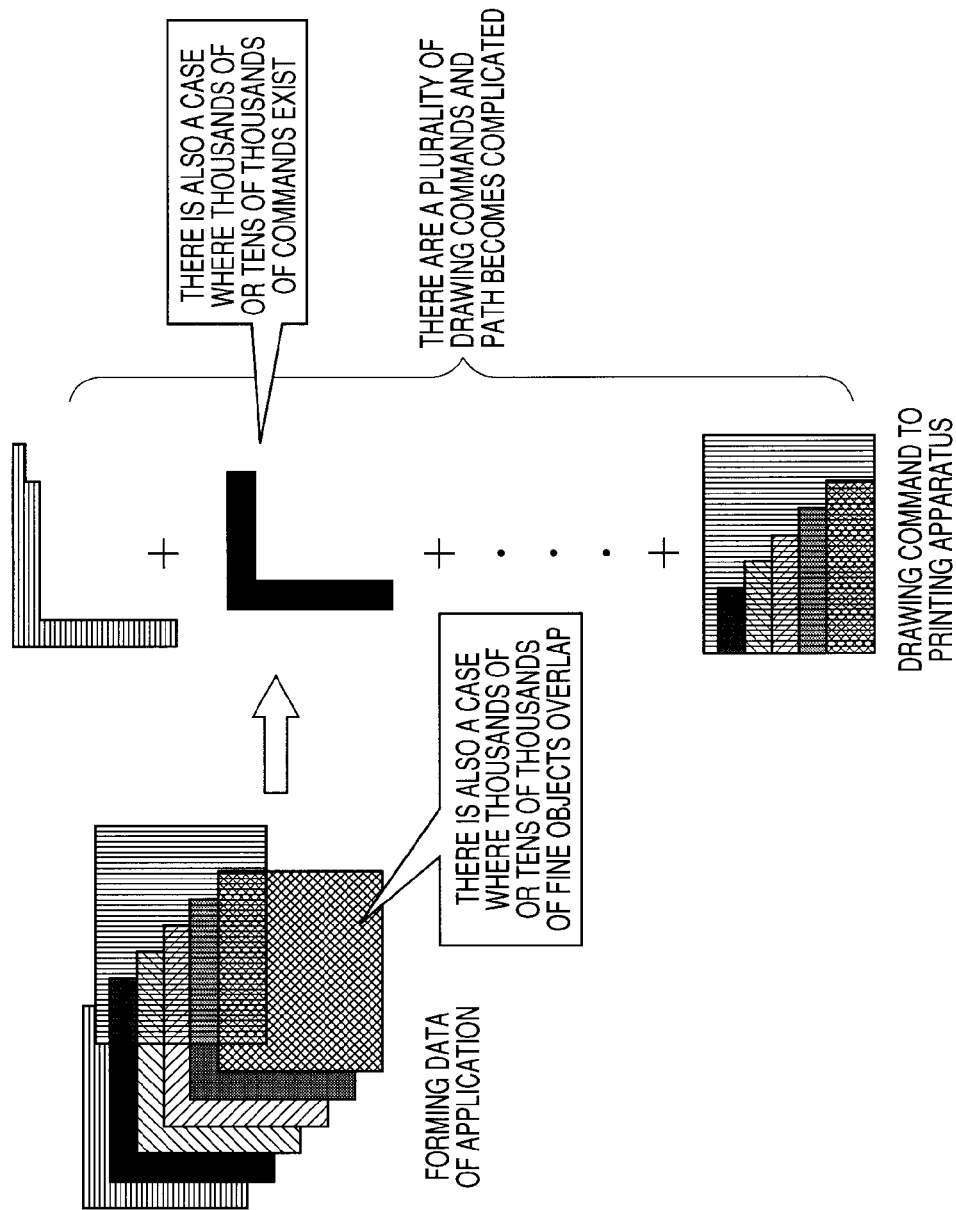
FIG. 20 is a diagram illustrating an example in which a large quantity of commands are divided in the case where there are a large number of drawing elements in the arithmetic operating region.

In the related art, when a large quantity of drawing instructions are included in the arithmetic operating region, a heavy load is applied due to the process for hollowing out the transmission portion or the like (FIG. 20). Since there is a case where thousands of or tens of thousands of fine drawing elements overlap, the many hollowing-out processes occur.

Figure 21:
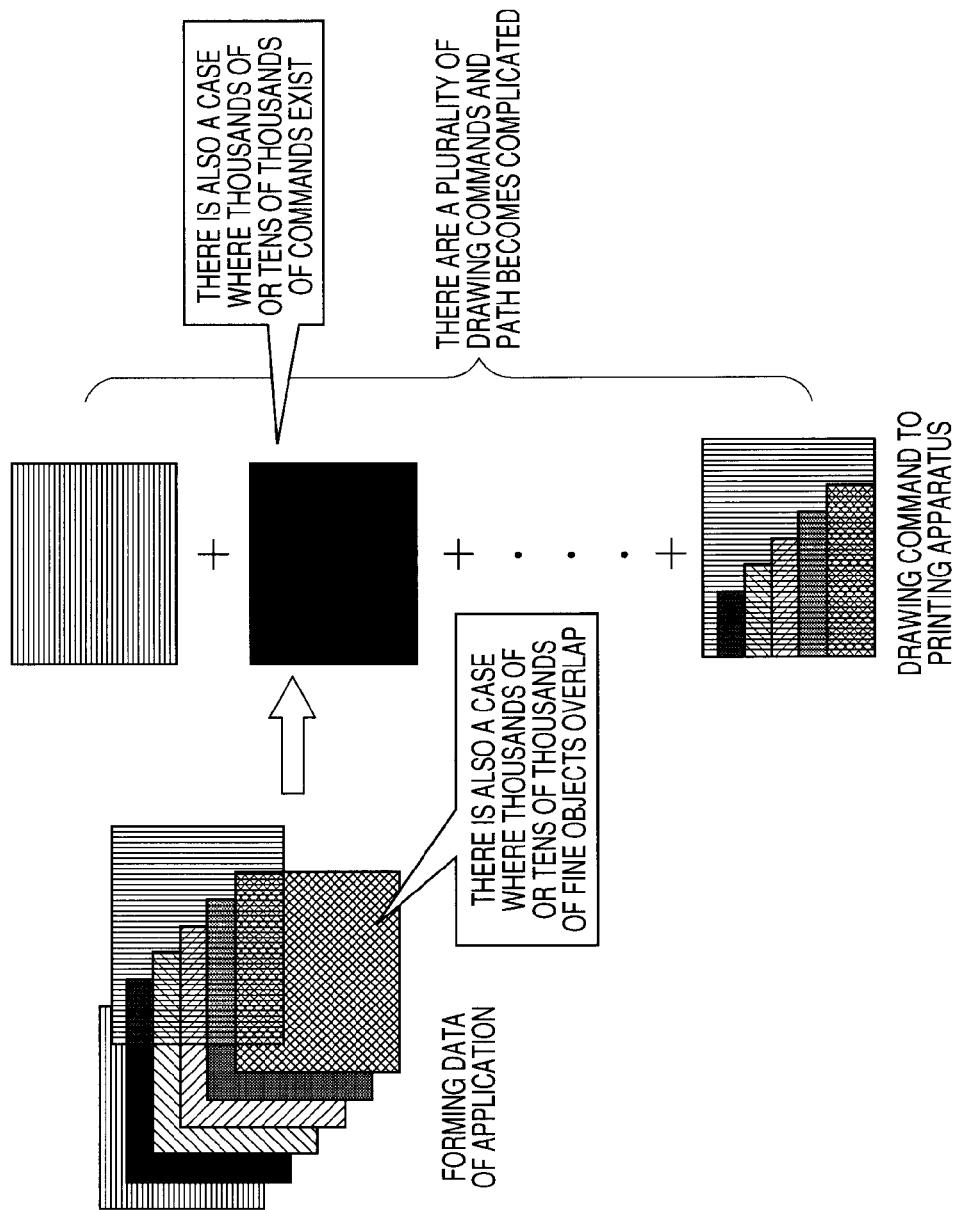
FIG. 21 is a diagram illustrating a case where even if there are a large number of drawing elements in the arithmetic operating region, the commands do not become complicated according to the embodiment.

In the embodiment, as illustrated in FIG. 21, the heavy "process for hollowing out the transmission portion" is unnecessary and the drawing command to be sent is simple because the forming data of the application can be converted as it is into the drawing command.

Further, in the drawing information processing apparatus of the embodiment, if it is decided in the drawing process discriminating unit 20 that the number of edge lists in the arithmetic operating region or a complexity degree is equal to a threshold value or more, a process for extending the arithmetic operating region to the circumscribed rectangle including the edge lists can be also executed (S204). The threshold value is, for example, set as a default value or set by the user through the user interface unit 12.

Figure 7:
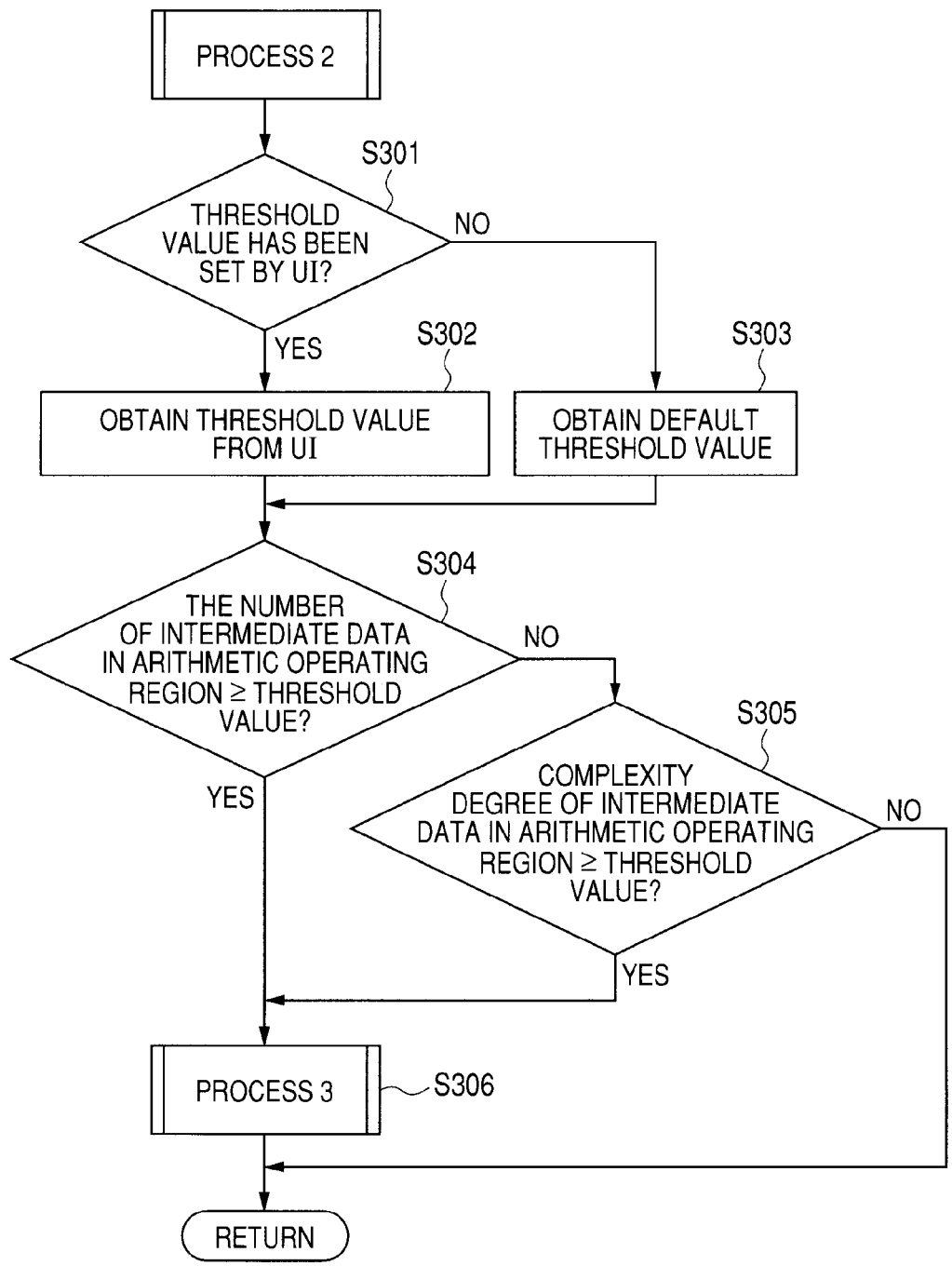
FIG. 7 is a flowchart illustrating a process for discriminating whether or not a circumscribed rectangle of an arithmetic operating region is extended.
Figure 8:
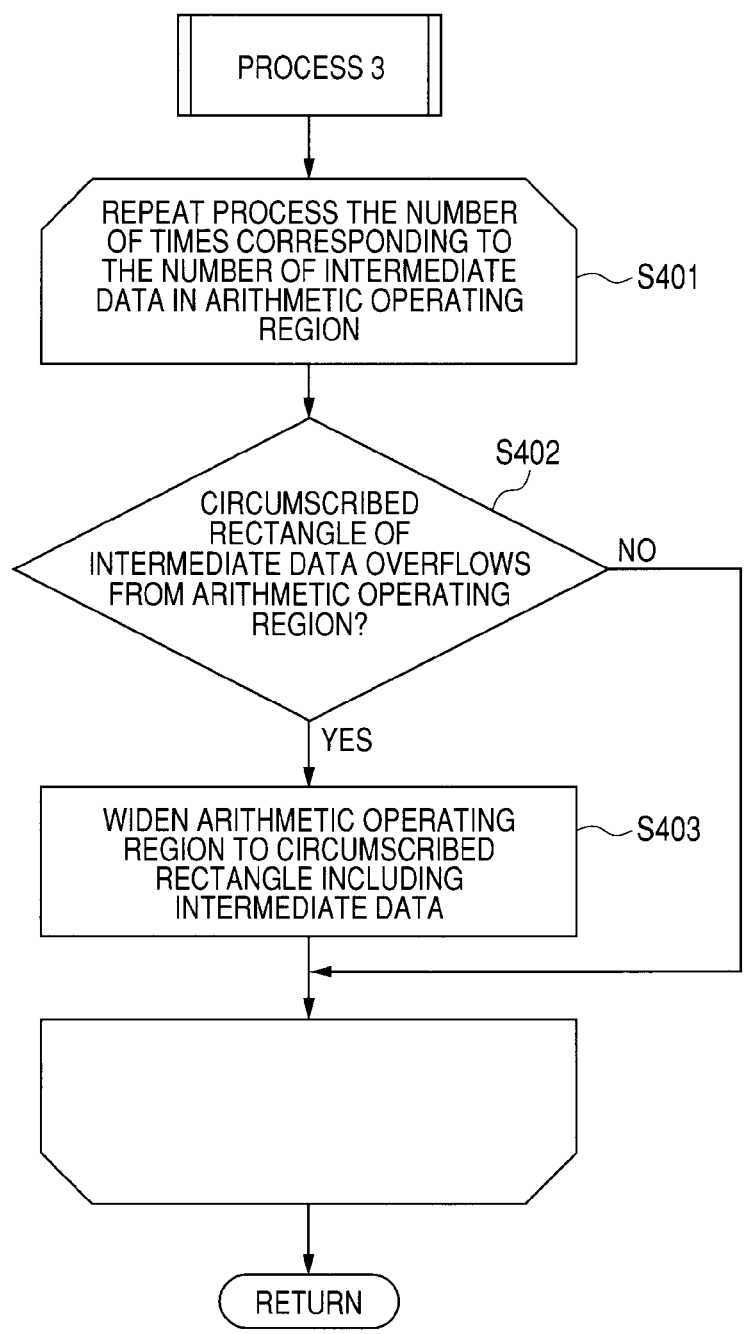
FIG. 8 is a flowchart illustrating a process for extending the circumscribed rectangle of the arithmetic operating region.

A description will be made with reference to flowcharts of FIGS. 7 and 8. The flowcharts are stored in the main storage device 2 and executed by the central processing unit 1. However, they may be executed by the CPU in the display apparatus 5 or can be also executed by an application program which can execute the bit map process in the client computer.

If the threshold value of the number of intermediate data and the complexity degree have been preset by the UI (S301), the threshold value designated by the UI is used (S302). If they are not preset, a default threshold value is used (S303). If the number of intermediate data in the arithmetic operating region is equal to the threshold value or more (S304) or the complexity degree is equal to the threshold value or more, a process 3 is executed. In the process 3, if the circumscribed rectangle of the intermediate data overflows from the arithmetic operating region (S402) by an amount corresponding to the intermediate data existing in the arithmetic operating region (S401), the process for extending the arithmetic operating region to the circumscribed rectangle including the intermediate data (S403) is executed.

Figure 22:
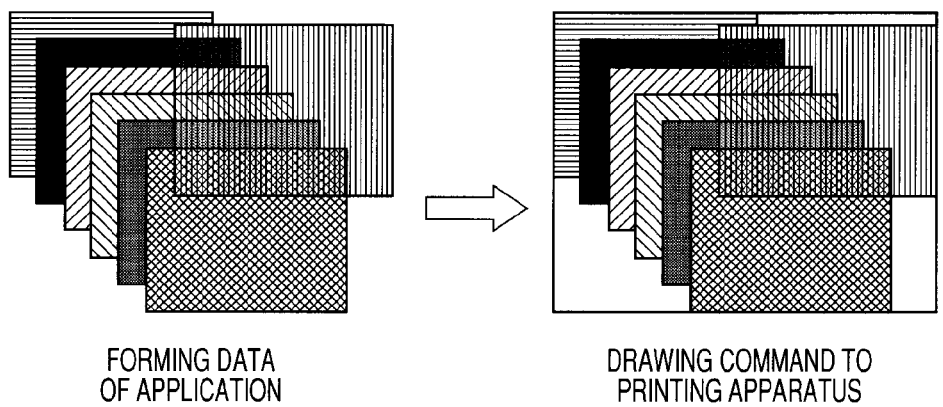
FIG. 22 is a diagram illustrating a drawing command in the case where the arithmetic operating region is extended to a circumscribed rectangle including an edge list.
Figure 23:
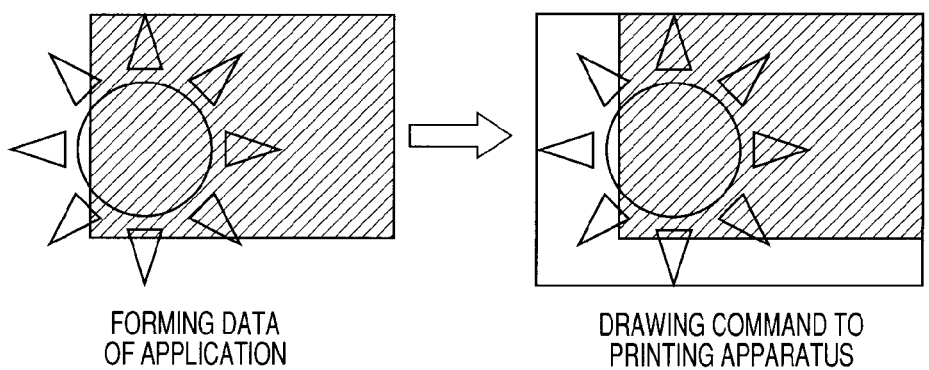
FIG. 23 is a diagram illustrating a drawing command in which the arithmetic operating region is extended in the case of a complicated drawing element.

In the case where a large quantity of edge lists are included in the arithmetic operating region as illustrated in FIG. 22 by this process, the edge lists can be collectively changed to one drawing command. Even in the case where complicated drawing elements are included in the arithmetic operating region as illustrated in FIG. 23, the drawing elements can be also collectively changed to one drawing command. Since there are no intermediate data out of the arithmetic operating region, there is no need to divide the intermediate data (S210 is skipped) and the process which needs a long time can be omitted.

If the present processing routine is executed by a flow for spooling the drawing commands of one page and, thereafter, sending the drawing commands instead of successively transmitting the drawing commands, the number of commands to be sent can be decreased. In the case where thousands of or tens of thousands of drawing objects overlap in the arithmetic operating region, although it is necessary to send thousands of or tens of thousands of drawing commands, according to the present processing routine, it is sufficient to send only one drawing command. Although the transmission of the first command to the printing apparatus is delayed, the invention is valid in the case where it is required to decrease the number of commands because the network is slow or the like.

The problem in which the white stripe (gap) occurs between the "transparent data" and the "portion in which the transmission portion has been hollowed out" by the arithmetic operation error or the like in the device (FIG. 18) does not occur also in the case of using the present processing routine.

The present image process may be executed by the CPU in the display apparatus 5 or can be also executed by an application which can execute the bit map process in the client computer.

The embodiment of the invention can be realized by, for example, a method whereby the computer executes the program. Means for supplying the program to the computer, for example, a computer-readable recording medium such as a CD-ROM or the like in which the program has been recorded or a transmitting medium such as Internet or the like for transmitting the program can be also applied as an embodiment of the invention. The foregoing program can be also applied as an embodiment of the invention. The foregoing program, recording medium, transmitting medium, and program product are incorporated in the purview of the invention.

According to the embodiment of the invention, such an operation that after the intermediate data of one page was spooled by the printer driver, the drawing command is formed is unnecessary. When the drawing instruction is received from the application, the drawing command can be immediately formed and sent. The drawing operation can be started in the printing apparatus. The generation of the white stripe (gap) can be also suppressed.

Further, also in the case where there are a number of objects which overlap the transparent data, they can be efficiently processed. Since such an operation that after the intermediate data of one page was spooled, the drawing command is formed is unnecessary. When the drawing instruction is received from the application, the drawing instruction is immediately converted into the drawing command and the drawing command is sent to the printing apparatus. Consequently, the drawing process in the printing apparatus can be started early and the total print time can be shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-166090, filed Jun. 25, 2008, which is hereby incorporated by reference in its entirety.

The invention claimed is:

1. A method of transmitting objects to a printer comprising:
   receiving an opaque object;
   transmitting the opaque object to the printer;
   holding the opaque object;
   receiving another object which overlies part of the opaque object;
   after the transmitting of the opaque object, determining whether or not the other object is translucent;
   using the held opaque object and the other object determined to be translucent by the determining, generating a new opaque object corresponding to the other object blended with the part of the opaque object; and
   transmitting the new opaque object to the printer.

2. The method of transmitting objects according to claim 1, wherein the transmitted opaque object is partially overwritten by the transmitted new opaque object.

3. The method of transmitting objects according to claim 2, wherein a part of the transmitted opaque object, which corresponds to the part of the received opaque object, is overwritten by the transmitted new opaque object.

4. The method of transmitting objects according to claim 3, wherein the printer is configured to perform the overwriting.

5. The method of transmitting objects according to claim 1, wherein, after the opaque object is transmitted to the printer, the new opaque object is generated and transmitted to the printer.

6. The method of transmitting objects according to claim 1, further comprising retaining the held opaque object after the opaque object is transmitted.

7. The method of transmitting objects according to claim 1, wherein the opaque object and the other object are received from an operating system of an information processing apparatus, and the opaque object and the new opaque object are transmitted in a form of command suitable for the printer.

8. The method of transmitting objects according to claim 1, wherein the generated new opaque object is a bitmap object.

9. The method of transmitting objects according to claim 1, wherein the other object is received in a graphic command form and the new opaque object is transmitted in an image command form.

10. The method of transmitting objects according to claim 1, wherein the generating comprises rasterizing the other object and the part of the opaque object and blending the rasterized other object and the rasterized part.

11. The method of transmitting objects according to claim 1, wherein the other object does not overlie a remaining part of the opaque object.

12. A non-transitory computer-readable storage medium storing a program for causing a computer to execute a method of transmitting objects to a printer, the method comprising:
   receiving an opaque object;
   transmitting the opaque object to the printer;
   holding the opaque object;
   receiving another object which overlies part of the opaque object;
   after the transmitting of the opaque object, determining whether or not the other object is translucent;
   using the held opaque object and the other object determined to be translucent by the determining, generating a new opaque object corresponding to the other object blended with the part of the opaque object; and
   transmitting the new opaque object to the printer.

13. An information processing apparatus comprising:
   a memory; and
   at least one processor which executes a program stored in the memory to:
   hold one or more objects which have been transmitted to a printer;
   receive an object;
   determine whether or not the received object is translucent;
   extract, from the held one or more objects, at least one object which is overlapped by the received object determined to be translucent by the determination;
   generate an opaque object using the received object determined to be translucent by the determination and the extracted object; and
   transmit the generated opaque object to the printer.

14. The information processing apparatus according to claim 13, wherein the held one or more objects are opaque.

15. The information processing apparatus according to claim 13, wherein, in a rasterization process by the printer, the transmitted generated opaque object overlaps an object which has been transmitted to the printer and corresponds to the extracted object.

* * * * *